United States Patent
Sessums et al.

(10) Patent No.: US 8,365,996 B2
(45) Date of Patent: Feb. 5, 2013

(54) DEVICE AND METHOD FOR TOOL IDENTIFICATION AND TRACKING

(76) Inventors: Jeff Sessums, Highland, CA (US); Shannon Sessums, Highland, CA (US); John Cullen, Highland, CA (US)

( * ) Notice: Subject to any disclaimer, the term of this patent is extended or adjusted under 35 U.S.C. 154(b) by 149 days.

(21) Appl. No.: 12/916,296

(22) Filed: Oct. 29, 2010

(65) Prior Publication Data

US 2012/0103247 A1    May 3, 2012

(51) Int. Cl.
*G06K 5/00* (2006.01)
(52) U.S. Cl. ........................................ 235/385; 235/380
(58) Field of Classification Search .................. 235/385, 235/380, 375, 382, 382.5, 486, 487
See application file for complete search history.

(56) References Cited

U.S. PATENT DOCUMENTS

| | | | | |
|---|---|---|---|---|
| 6,708,879 | B2 * | 3/2004 | Hunt | 235/385 |
| 7,957,833 | B2 * | 6/2011 | Beucher et al. | 700/215 |
| 2003/0097304 | A1 * | 5/2003 | Hunt | 705/22 |
| 2003/0120525 | A1 * | 6/2003 | Feser et al. | 705/5 |
| 2010/0041364 | A1 * | 2/2010 | Lott et al. | 455/404.1 |
| 2011/0315765 | A1 * | 12/2011 | Schantz et al. | 235/385 |
| 2012/0066019 | A1 * | 3/2012 | Hinshaw et al. | 705/7.23 |

* cited by examiner

*Primary Examiner* — Thien M Le
(74) *Attorney, Agent, or Firm* — Donn K. Harms

(57) ABSTRACT

A method for visual tool identification employing unique indicia as an identifier of an owner of a tool. The indicia identifiers are assigned by a provider and a database of tools owned and bearing said indica is maintained. The unique indicia identifier is preferably discernable from a distance such as further than the unaided eye may recognize a face so that third parties may identify tools and their owners from a distance.

5 Claims, 2 Drawing Sheets

DEVICE AND METHOD FOR TOOL IDENTIFICATION AND TRACKING

FIELD OF THE INVENTION

The device herein described and enclosed generally relates to power tool identification. More specifically the enclosed device relates to a user-personalized highly visible color scheme for easy identification of power tool ownership from a distance. Employment of the method and device provides a means to identify ownership of power tools at a distance where writing would be illegible, in order to deter job site thefts of equipment and to allow workers to more easily identify their equipment.

BACKGROUND OF THE INVENTION

Construction sites have always been a chaotic workplace. The multitude of supplies being delivered, personnel coming and going, and resulting equipment and vehicles which frequent and then leave such job sites, making it inherently hard to keep track all of the people and tools and equipment visiting and leaving the site. Additionally, because workers tend to move from position to position on large sites, and change tools depending on the task at hand, it can makes it difficult for tool owner's to keep track of their very expensive professional power tools.

Additionally, the power tool market is dominated by a small handful of companies which in their quest to maintain their brand identification, tend to make the tools sold, look identical when viewed close-up, let alone when viewed from a distance. Because of the small number of manufacturers for professional as well as non-professional power tools, and their noted visual similarity, the potential for two people on the same job site, owning identical looking tools is very high. With the similarity in ornamental appearance, even two individuals viewing their respective tools close-up, can have trouble identifying their respective tool if they are both the same brand of tool.

Methods of tool identification exist, but still allow for some ambiguity. Name tags might be glued on individual tools but easily fall off in the tough construction environment. Painting tools has been a known manner of customizing the ornamental aspects to aid in identification, however paint easily wears off and can damage the mechanical and electrical components of tools if applied improperly.

While individual tools owned by individual workers might be engraved or marked somehow to make them identifiable as owned by a certain worker, from a distance such tags and engraving cannot be seen. Consequently, it is virtually impossible to identify an individual tool by ownership from two tools of the same brand and color scheme, from a distance. This problem only increases on a job site where a large contractor may be supplying power tools for their workers use which are owned by the contractor. With the tools of the same brand, as noted above, being substantially identical in ornamental aspects, it can be hard to tell the difference between an individual owner's tools, and those owned by the contractor.

As a consequence, the threat of job site theft of power tools is ever present and is on the rise. While construction sites have always been exposed to the threat of theft and vandalism at night, tool theft during working hours is becoming an increasingly annoying nuisance for laborers and contractors alike. In fact, tool theft has become so common in some areas that contractors have begun to factor in stolen tools as a cost of business in each contract.

Often the culprits are fellow workers or employees of the contractor supplying power tools, who simply walk away with tools that don't belong to them. With the ornamental commonalities between makes and models, and the fact that from a distance most power tools look quite similar, it is exceedingly hard to ascertain if tools are in the possession of unauthorized users or being stolen by people leaving a job site. One may even watch a thief walk away with one's drill and not think twice because "they all pretty much look the same anyway."

Methods of tool security exist, however most are in the forms of overnight secure storage. Currently there is no means to addresses the problem of tool theft during working hours since a person leaving with a tool, from a distance, cannot be identified as being in the possession of a tool they do not own. Few, if any workers, want to yell at someone leaving a job site and accuse them of stealing based on viewing the tool from 100 feet away or more. Such an accusation could be very embarrassing at the least, if incorrectly asserted.

As noted above, there are labeling and engraving markings that may be done to tools to match them to the owner. However such markings and engravings are generally not easily viewed from close up, to say nothing of twenty yards away.

Thus, there is an unmet need for a method of tool identification which renders ownership of a tool ascertainable from a distance where labels and markings cannot be read. Such an apparatus and method should allow individual users to ornamentally mark their tools so they can discern their ownership from a distance. Such a method and apparatus should allow owners of large amounts of such tools to mark them all in an ornamentally viewable fashion to make them easily identifiable from a distance. Further, such a system, if employed with many contractors and firms owning large numbers of tools, should be easily customizable to provide a visually recognizable means to identify tools owned by each such firm, even on the same job site.

Finally, such a system and apparatus should employ a tracking element that is geospatially conscious of which owner is located and where to avoid ornamental configurations for users who are proximate and could become confused.

In this respect, before explaining at least one embodiment of the method and apparatus of the disclosed tool identification method and apparatus in detail, it is to be understood that the invention is not limited in its application to the details of construction and to the arrangement of the components set forth in the following description or illustrated in the drawings nor the steps outlined in the specification. The invention is capable of other embodiments and of being practiced and carried out in various ways as those skilled in the art will readily ascertain just from reading this application. Also, it is to be understood that the phraseology and terminology employed herein are for the purpose of description and should not be regarded as limiting.

As such, those skilled in the art will appreciate that the conception upon which this disclosure is based may readily be utilized as a basis for designing other methods and systems for carrying out the ornamental identification system herein and the several purposes of the present intention. It is important, therefore, that the claims be regarded as including such equivalent construction and method of operation insofar as they do not depart from the spirit and scope of the present invention.

SUMMARY OF THE INVENTION

There is disclosed and described herein a method and apparatus which when employed, provides a means for easy tool ownership identification from a distance of many yards and well beyond any person's ability to read lettering and tags. When employed for an individual, it is highly customizable to provide distance-viewable markings to a tool that the owner can easily identify. When employed as a system for owners or large numbers of power tools, such as a contractor providing tools to employees, the system provides both the ornamental identification system and a geographic based ornamental assignment system to prevent the potential for duplicate handle marking identification schemes within a defined geographic area.

The disclosed device takes advantage of the fact that mass produced tools, even expensive tools, employ plastic and other types of formed handles which engage the housing holding the motor and mechanical components of the tool in question. Tools of the same brand and configuration, will generally employ one or a plurality of handles on the tool which are detachable and replaceable with similarly configured handle components.

Taking advantage of this commonality of handles and mountings used by manufacturers, the device herein employs custom-molded handle components which are either extruded or painted in very unique colors and patterns and color combinations. Color and patterns of color are favored because from a distance, they are easily discernable by the human eye. If the color and/or pattern combinations are unique to an owner, they will easily identify their power tools from many yards away by simply viewing them from that distance.

The apparatus thus employs replacement handles and the like which are either one solid color such as bright pink which is easily identified from a distance, or preferably a multicolor pattern which allows for much more customization by a user than a single color might. The resulting handles, when engaged to the tools in replacement of the factory-installed handles, provides an easy means for identification of ownership of the tool from either up close or at a distance where generally such could not be ascertained.

In use, the device may be applied to a multitude of power tools by forming replacement handles adapted to engage the factory mounting fasteners used for such handles, such as screws. For example, a circular or skill-saw traditionally employs a trigger style handle toward the rear of the saw that provides a grip for the user's hand and a trigger in reach of the user's trigger finger while gripping the handle. A second additional handle is normally positioned laterally above the circular blade, and able to be gripped by the user's second hand.

For such a saw, the device herein may provide replacement handles, for one or both of the two handles for the saw. The replacements would be adapted to use the factory mounting screws and replace the existing handle or handles as is done when the handles break normally. However, instead of providing the conventionally colored handles, as would a manufacturer, the device and method herein provide highly customized handles for one or both handles for the saw.

Consequently, one, or both of the plastic trigger style handles, as well as the lateral handle over the saw blade of such a saw, would be replaced with uniquely colored and decorated handles which are colorized and patterned for easy identification from a distance of many yards. Preferably, the custom coloring and patterns would employ very bright colors in combinations and patterns rendering them easily customizable as well as recognizable from a distance.

The second facet of the device and method herein would employ a tracking system which assigns the various color and pattern combinations geographically so that two geographically proximate users do not get the same color combination and or patterns imparted to their handles. This is because a brightly colored red saw handle will do no good if someone else has the same red skill saw handle in the same town or on the same job site. In order to prevent like colors, color combinations, and color and pattern combinations from showing up at the same job site, each color, combination, and pattern, is tracked geographically. As a consequence, large users of such handles who have unique color combinations or colors and patterns, as well as small users, will generally receive replacement handles decorated in colors and or patterns which are unique to their geographic location. Thus, on a job site, no two owners will have colorized or patterned handles which are substantially similar enough to cause confusion. Conversely, the finite number of colors and patterns which are available, may be more widely used since individual geographic areas which are disparate can use the same patterns and colors for different tool owners.

It is thus an object of the invention to provide tool owners with a visual means of easy identification of personal tools, especially from a distance.

Additionally, it is an object of the invention to provide a means of preventing duplicate visually distinct identification methods within a defined geographic are, thereby providing owners a completely unique way to identify their tools.

These, together with other objects and advantages, which will become subsequently apparent, reside in the details of the construction and method as more fully hereinafter described and claimed, reference being had to the accompanying drawings forming a part thereof, wherein like numerals refer to like parts throughout.

BRIEF DESCRIPTION OF THE DRAWING FIGURES

DETAILED DESCRIPTION OF PREFERRED EMBODIMENT

Figure 1:
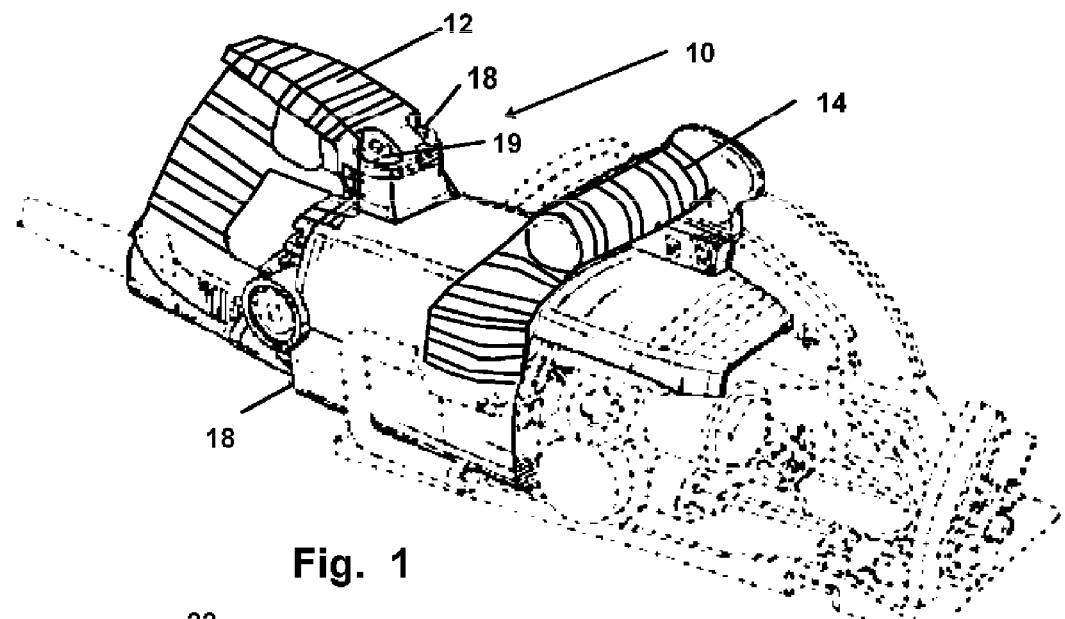
FIG. 1 depicts the invention as applied to a typical handle-engaged tool such as the depicted circular saw.
Figure 2:
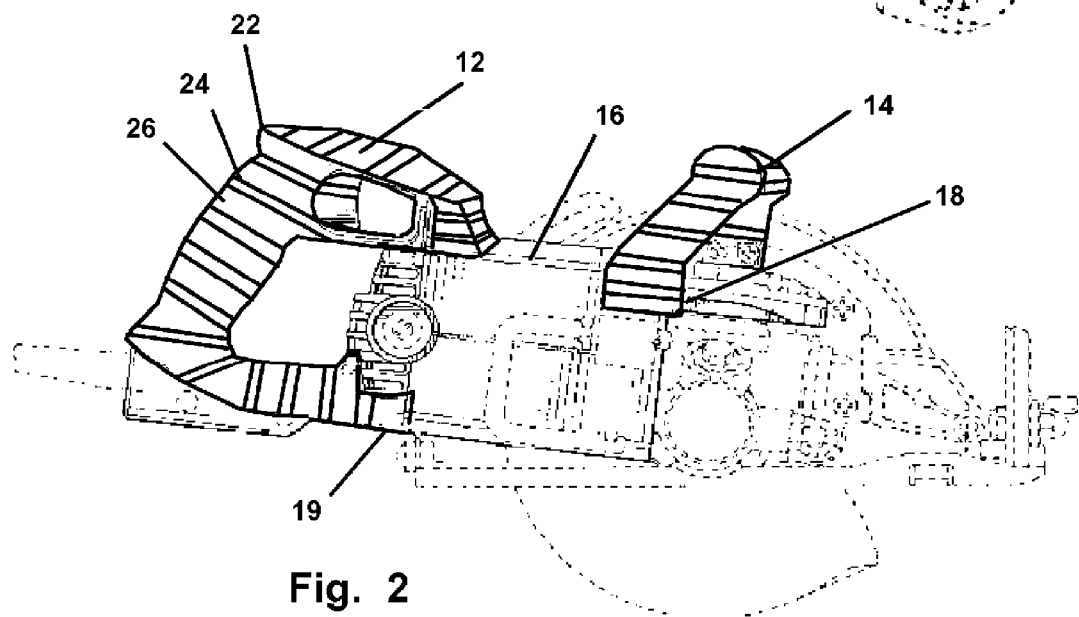
FIG. 2 depicts a second view of the ornamentally decorated handles employed to provide tool identification from a distance.
Figure 3:
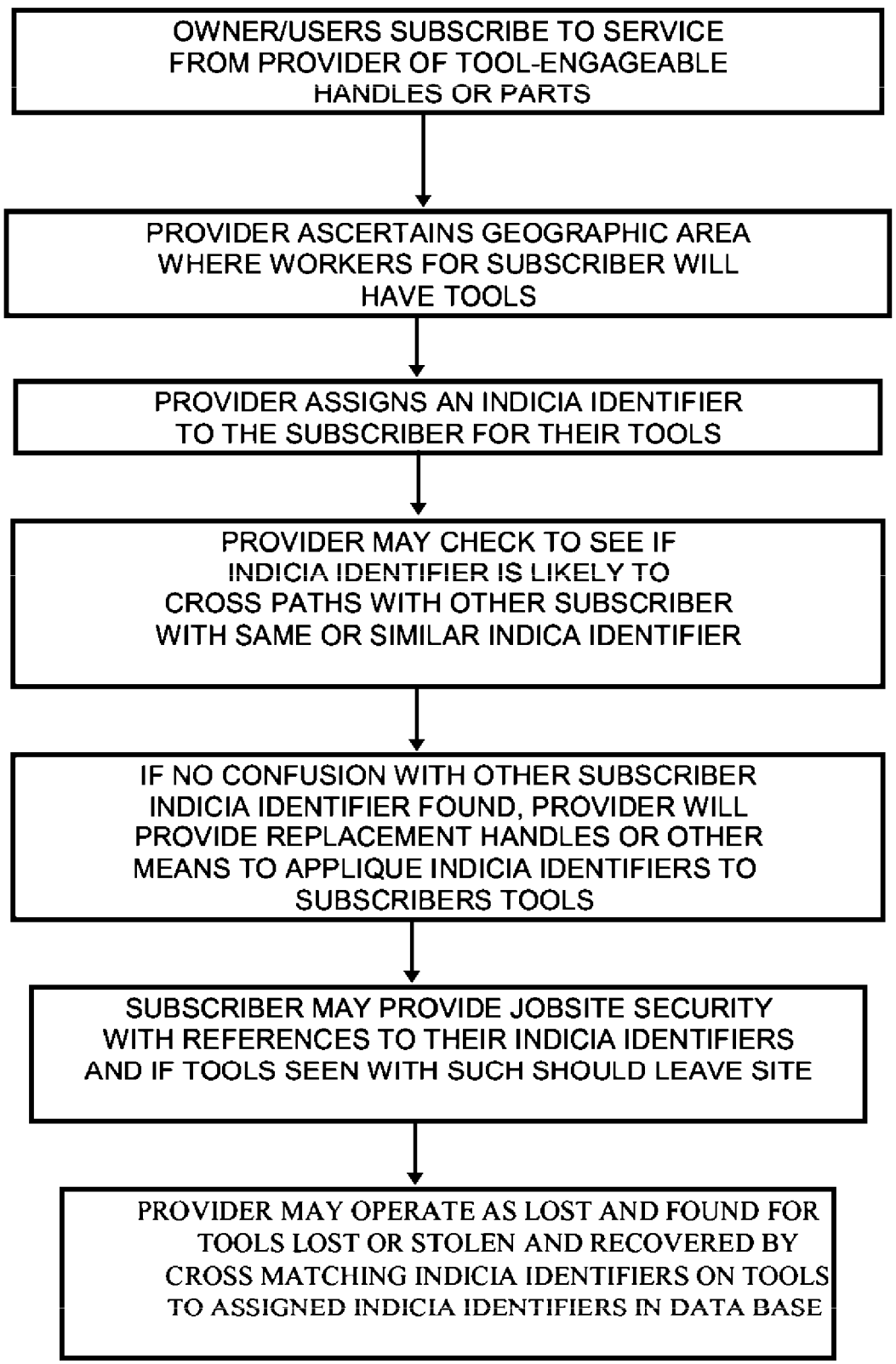
FIG. 3 depicts a flow chart of the system herein where a provider provides a unique indicia identifier to subscribers and maintains a database thereon.

Referring now to the drawings in FIGS. 1-3, wherein similar parts are identified by like reference numerals, the handles 12 and 14 are adapted to be engaged to the tool 16 which can be any tool with attachable handles 12 and 14, using the conventional fasteners such as screws 18 which engage through aligning mounting apertures 19 which are posited in the handles 12 and 14, and engage with the tool 16. As supplied herein the device 10, can of course employ other means for engagement for the tool 16 such as screws, snaps and other attaching means as would occur to those skilled in the art, including covers bearing the unique indicia 22 allowing easy discerning from a distance. The depicted stripes 24 and 26 of different adjacent colors are just one example of such indicia 22 identifiable from a distance that may be employed. Bright or high contrast adjacent colors and patterns of color are favored for the identifiable indicia 22 since such is easily discernable by the human eye from a distance, even without glasses or with a marginal view.

As noted, if the indicia 22 forming the color and/or pattern combinations are unique and related to an owner, the owner and third parties can easily identify the owner's power tools from many yards away by simply viewing them from that distance.

In use, the device 10 and method herein may be applied to a multitude of power tools 16 for many different owners, by forming replacement handles 12 and 14, adapted to engage the factory mounting fasteners used for such handles 12 and 14, using indicia 22 to form colors, stripes, patterns, words, or any indicia identifiable with an individual owner, that are unique to that individual owner and maintaining a database of such owners and their matching identifiable indicia. The same indicia may be employed to a plurality of different owners so long as they are sufficiently remote to each other geographically. Consequently the provider for the service would track in the database the location of individual owners, and the scope of their work in different geographic locations so as to not use the same indicia 22 for any handles 12 and 14, in a geographic area likely to overlap with another owner having the same color patterns or indicia identifiers and the like in their respective indicia 22.

In this fashion, contractor owners would be able to lend or provide tools to employees on jobsites, and each such owner contractor would have a unique indica 22 color pattern or the like in their respective geographic area. The provider of the handles 12 and 14 with the indicia 22 would maintain a database that relates the indicia 22 to owners and also keeps track of geographic location of the owners or their geographic areas of work, so as to not assign the same indicia 22 to two different owners in the same geographic overlapping areas. It is especially preferred that the indicia identifier is viewable and discernable from a distance even further away than a person can recognize the party carrying the tool. In that fashion, people walking off job sites with tools can be watched and the indicia identifiers can be discerned to ascertain if the tool should in fact be leaving the site.

As a method of employing the device 10, the supplier of the handles 12 and 14 will maintain a tracking system which assigns the various color and pattern combinations geographically so that two geographically proximate users do not get the same color combination and or patterns forming the indicia 22 imparted to their handles. Lost tools or otherwise removed tools could subsequently be identified by contacting the supplier and ascertaining the owner of the indicia 22 pattern on the tool so it might be reunited with the owner.

While all of the fundamental characteristics and features of the disclosed device and method of providing replacement handles bearing unique indica thereon identifiable from a distance, have been described herein, with reference to particular embodiments thereof, a latitude of modification, various changes and substitutions are intended in the foregoing disclosure and it will be apparent that in some instances, some features of the invention will be employed without the corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

Further, the purpose of the herein disclosed abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A method for visual tool identification comprising the steps of:
    ascertaining identification information concerning subscribers and entering it into a database;
    from said subscribers, eliciting areas of geographic use of tools by employees and associating it with said subscriber in said database;
    from said subscribers, eliciting identification information of individual tools in said subscriber's inventory of said tools and associating it with said subscriber in said database;
    ascertaining a unique indicia identifier which may be assigned to each subsequent said subscriber, which is not confusable with another said indicia identifier in said geographic area of use of said subsequent subscriber;
    assigning said unique indicia identifier to each said subscriber and associating said respective unique indicia identifier with a respective said subscriber in said database, for a placement on each said respective tool identified to a respective subscriber in said database,
    providing said unique indicia identifier to each respective said subscriber for affixation to said tools in said respective inventory of tools of said respective subscriber, whereby said tools may be identified with a specific owner by a viewing of a respective said unique indicia identifier; and
    providing said unique indicia identifier in the form of replacement handles for said tools, said replacement handles bearing said unique indicia identifier.

2. The method for visual tool identification of claim 1 comprising the additional steps of:
    providing said unique indicia identifier in the form of engageable labels for said tools, said labels bearing said unique indicia identifier.

3. The method for visual tool identification of claim 2 comprising the additional steps of:
    creating said unique indicia identifier using colors and/or patterns which may be discerned at a distance by a third party, said distance being such that an unaided eye cannot recognize a human face, whereby a third party such as a security guard may ascertain from said distance, if a said tool owned by a subscriber is leaving a geographic area watched by said third party.

4. The method for visual tool identification of claim 1 comprising the additional steps of:
    creating said unique indicia identifier using colors and/or patterns which may be discerned at a distance by a third party, said distance being such that an unaided eye cannot recognize a human face, whereby a third party such as a security guard may ascertain from said distance, if a said tool owned by a subscriber is leaving a geographic area watched by said third party.

5. The method for visual tool identification of claim 1 comprising the additional steps of:
    providing a lost and found service for subscribers for said tools sent to said provider bearing said unique indicia identifier by cross matching said unique indicia identifier with a subscriber to which it was assigned in said database.

* * * * *